United States Patent
Uchino et al.

(10) Patent No.: US 9,894,639 B2
(45) Date of Patent: Feb. 13, 2018

(54) MOBILE COMMUNICATION SYSTEM, RADIO BASE STATION, AND MOBILE STATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/424,141

(22) PCT Filed: Aug. 9, 2013

(86) PCT No.: PCT/JP2013/071643
§ 371 (c)(1),
(2) Date: Feb. 26, 2015

(87) PCT Pub. No.: WO2014/034416
PCT Pub. Date: Mar. 6, 2014

(65) Prior Publication Data
US 2015/0230225 A1 Aug. 13, 2015

(30) Foreign Application Priority Data

Aug. 28, 2012 (JP) ................................. 2012-187811

(51) Int. Cl.
*H04W 72/00* (2009.01)
*H04W 72/04* (2009.01)
(Continued)

(52) U.S. Cl.
CPC ......... *H04W 72/0406* (2013.01); *H04L 5/001* (2013.01); *H04W 16/32* (2013.01); *H04W 76/021* (2013.01); *H04W 88/16* (2013.01)

(58) Field of Classification Search
CPC ...... H04W 24/08; H04W 36/24; H04W 36/83
(Continued)

(56) References Cited

U.S. PATENT DOCUMENTS

| 8,514,756 | B1* | 8/2013 | Ramachandra ..... H04L 61/2069 |
| | | | 370/310 |
| 2010/0056215 | A1* | 3/2010 | Gorokhov .............. H04B 7/024 |
| | | | 455/561 |

(Continued)

FOREIGN PATENT DOCUMENTS

| JP | 2012-507206 A | 3/2012 |
| WO | 2010/048577 A1 | 4/2010 |

(Continued)

OTHER PUBLICATIONS

International Search Report issued in PCT/JP2013/071643 dated Sep. 17, 2013 (4 pages).
Written Opinion of the International Searching Authority issued in PCT/JP2013/071643 dated Sep. 17, 2013 (4 pages).
Ericsson, ST-Ericsson; "LTE Release 12 and Beyond"; 3GPP RAN WS on Rel-12 and onwards, RWS-120003; Ljubljana, Slovenia; Jun. 11-12, 2012 (10 pages).

(Continued)

*Primary Examiner* — Joshua Schwartz
(74) *Attorney, Agent, or Firm* — Osha Liang LLP

(57) ABSTRACT

A bearer configuration in a case of using "Inter-Site CA" is properly defined. In a mobile communication system according to the present invention, an anchor radio base station eNB#1 which is one of radio base stations eNB#1 to eNB#3 is configured to map one EPS bearer #B established between a mobile station UE and a gateway device P-GW to radio bearers #3 to #5 established between the mobile station UE and the multiple radio base stations eNB#1 to eNB#3.

6 Claims, 9 Drawing Sheets

(51) Int. Cl.
 *H04W 76/02* (2009.01)
 *H04W 16/32* (2009.01)
 *H04L 5/00* (2006.01)
 *H04W 88/16* (2009.01)

(58) Field of Classification Search
 USPC .......................................................... 455/450
 See application file for complete search history.

(56) References Cited

U.S. PATENT DOCUMENTS

| | | | | |
|---|---|---|---|---|
| 2011/0310791 | A1* | 12/2011 | Prakash | H04W 24/02 370/315 |
| 2015/0131535 | A1* | 5/2015 | Wallentin | H04W 76/025 370/329 |

FOREIGN PATENT DOCUMENTS

| | | |
|---|---|---|
| WO | 2011100492 A1 | 8/2011 |
| WO | 2013068787 A1 | 5/2013 |

OTHER PUBLICATIONS

NTT Docomo, Inc.; "Requirements, Candidate Solutions & Technology Roadmap for LTE Rel-12 Onward"; 3GPP Workshop on release 12 and onwards, RWS-120010; Ljubljana, Slovenia; Jun. 11-12, 2012 (27 pages).

ETSI MCC; "Report of 3GPP RAN Workshop on Release 12 and onwards"; 3GPP RAN Workshop on Release 12 and onwards; RWS-120052; Ljubljana, Slovenia; Jun. 11-12, 2012 (24 pages).

3GPP TS 36.300 V11.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Jun. 2012 (201 pages).

Extended European Search Report in counterpart European Patent Application No. 13832977.6, dated Jun. 13, 2016 (6 pages).

Office Action issued in the counterpart European Patent Application No. 13832977.6, dated Mar. 23, 2017 (5 pages).

Office Action issued in the counterpart Chinese Patent Application No. 201380044911.8, dated Sep. 4, 2017 (14 pages).

* cited by examiner

MOBILE COMMUNICATION SYSTEM, RADIO BASE STATION, AND MOBILE STATION

TECHNICAL FIELD

The present invention relates to a mobile communication system, a radio base station, and a mobile station.

BACKGROUND ART

In LTE (Long Term Evolution) Release-10, CA (Carrier Aggregation) was introduced to realize wide-band communication beyond 20 MHz (for example, communication at 100 Hz). In CA, communication is performed by using bundled CCs (Component Carriers) under a single radio base station eNB as illustrated in FIG. 8(a).

Afterwards, in LTE Release-12 and beyond, "Small Cell enhancement" was proposed, and "Inter-site CA" in which communication is performed by using bundled CCs (cells) under different radio base stations eNB has been studied for introduction as a more flexible network architecture than conventional ones (see FIG. 8(b)).

PRIOR ART DOCUMENT

Non-Patent Document

Non-patent document: 3GPP 36.300

SUMMARY OF THE INVENTION

In conventional LTE, one EPS (Evolved Packet System) bearer is mapped to one radio bearer as illustrated in FIG. 9.

Specifically, as illustrated in FIG. 9, the EPS bearer includes one radio bearer, one S1 bearer, and one S5/S8 bearer.

Here, the radio bearer is established between a mobile station UE and a radio base station eNB, the S1 bearer is established between the radio base station eNB and a gateway device S-GW, and the S5/S8 bearer is established between the gateway device S-GW and a gateway device P-GW.

In other words, the EPS bearer is a bearer established between the mobile station UE and the gateway device P-GW.

However, conventional LTE has a problem of having no specifications for defining a bearer configuration in the case of using the "Inter-site CA".

Accordingly, the present invention has been made in view of the above problem, and an objective of the invention is to provide a mobile communication system, a radio base station, and a mobile station, with which a bearer configuration in a case of using "Inter-site CA" can be properly defined.

A first feature of the present invention is summarized as a mobile communication system in which a mobile station is capable of performing a carrier aggregation through cells under multiple radio base stations. Here, an anchor radio base station which is one of the multiple radio base stations maps one bearer established between the mobile station and a gateway device to a plurality of radio bearers established between the mobile station and the multiple radio base stations.

A second feature of the present invention is summarized as a radio base station capable of operating as an anchor radio base station among a plurality of radio base stations in a mobile communication system in which a mobile station is capable of performing a carrier aggregation through cells under multiple radio base stations. Here, one bearer established between the mobile station and a gateway device is mapped to multiple radio bearers established between the mobile station and the plurality of radio base stations.

A third feature of the present invention is summarized as a mobile station capable of performing a carrier aggregation through cells under multiple radio base stations. Here, one bearer established with a gateway device is mapped to multiple radio bearers established with the plurality of radio base stations.

DETAILED DESCRIPTION (Mobile Communication System According to the First Embodiment of the Present Invention)

A mobile communication system according to a first embodiment of the present invention will be described with reference to FIGS. 1 to 6.

The mobile communication system according to the present embodiment is the LTE mobile communication system, in which "Inter-site CA" can be applied.

Figure 1:
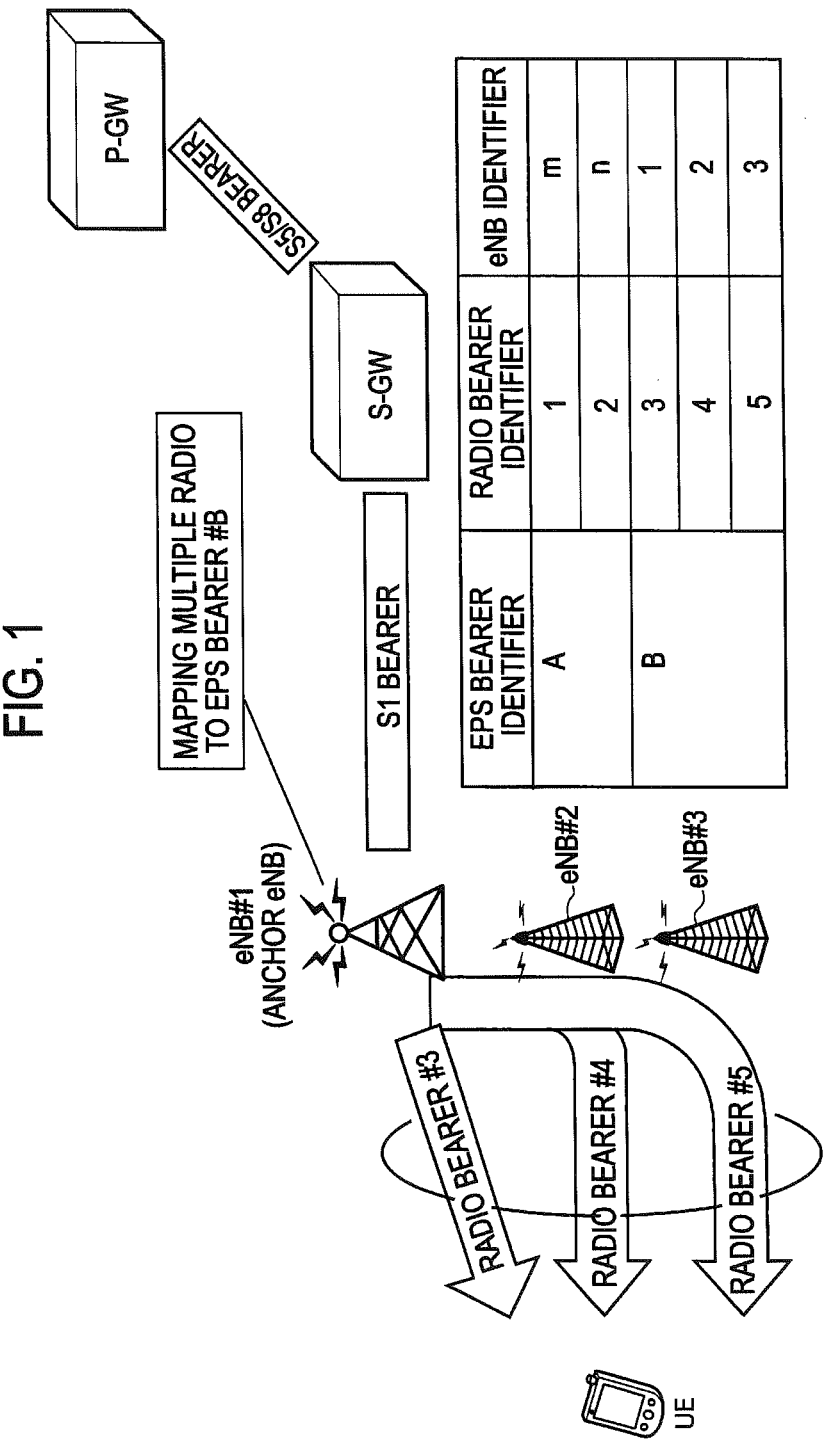
FIG. 1 is an entire configuration diagram of a mobile communication system according to a first embodiment of the present invention.

As illustrated in FIG. 1, the mobile communication system according to the embodiment includes a gateway device P-GW, a gateway device S-GW, and radio base stations eNB#1 to eNB#3.

For example, a cell #1 under the radio base station eNB#1 is a macro cell and cells #2 and #3 under the radio base stations eNB#2 and eNB#3 are phantom cells (small cells).

Also, coverage areas of the cells #1 to #3 under the radio base stations eNB#1 to eNB#3 are deployed to at least partially overlap with each other.

In the mobile communication system according to the present embodiment, "Bearer Sharing" in which one EPS bearer is mapped to multiple radio bearers can be applied.

Here, in the example of FIG. 1, the radio base station eNB#1 which is one of the radio base stations eNB#1 to eNB#3 is an anchor radio base station eNB, which maps one EPS bearer #B to multiple radio bearers #3 to #5 for a mobile station UE.

Here, the anchor radio base station eNB may be a radio base station eNB#1 managing a macro cell or may be other radio base station eNB. Also, in the mobile communication system according to the present embodiment or in a predetermined area in the mobile communication system according to the present embodiment, there may be one or multiple anchor radio base stations eNB for each mobile station UE.

Then, as illustrated in FIG. 1, the radio base station eNB#1 functioning as an anchor radio base station eNB may perform the above-described mapping for each mobile station UE by using a mapping table in which an identifier of one EPS bearer, identifiers of the multiple radio bearers, and identifiers of the multiple radio base stations eNB are associated with one another.

In the example of FIG. 1, the mapping table associates an identifier (#A) of one EPS bearer, identifiers (#1/#2) of the multiple radio bearers, and identifiers (#m/#n) of the multiple radio base stations eNB with one another.

Also, in the example of FIG. 1, the mapping table associates an identifier (#B) of one EPS bearer, identifiers (#3 to #5) of the multiple radio bearers, and identifiers (#1 to #3) of the multiple radio base stations eNB with one another.

Figure 2:
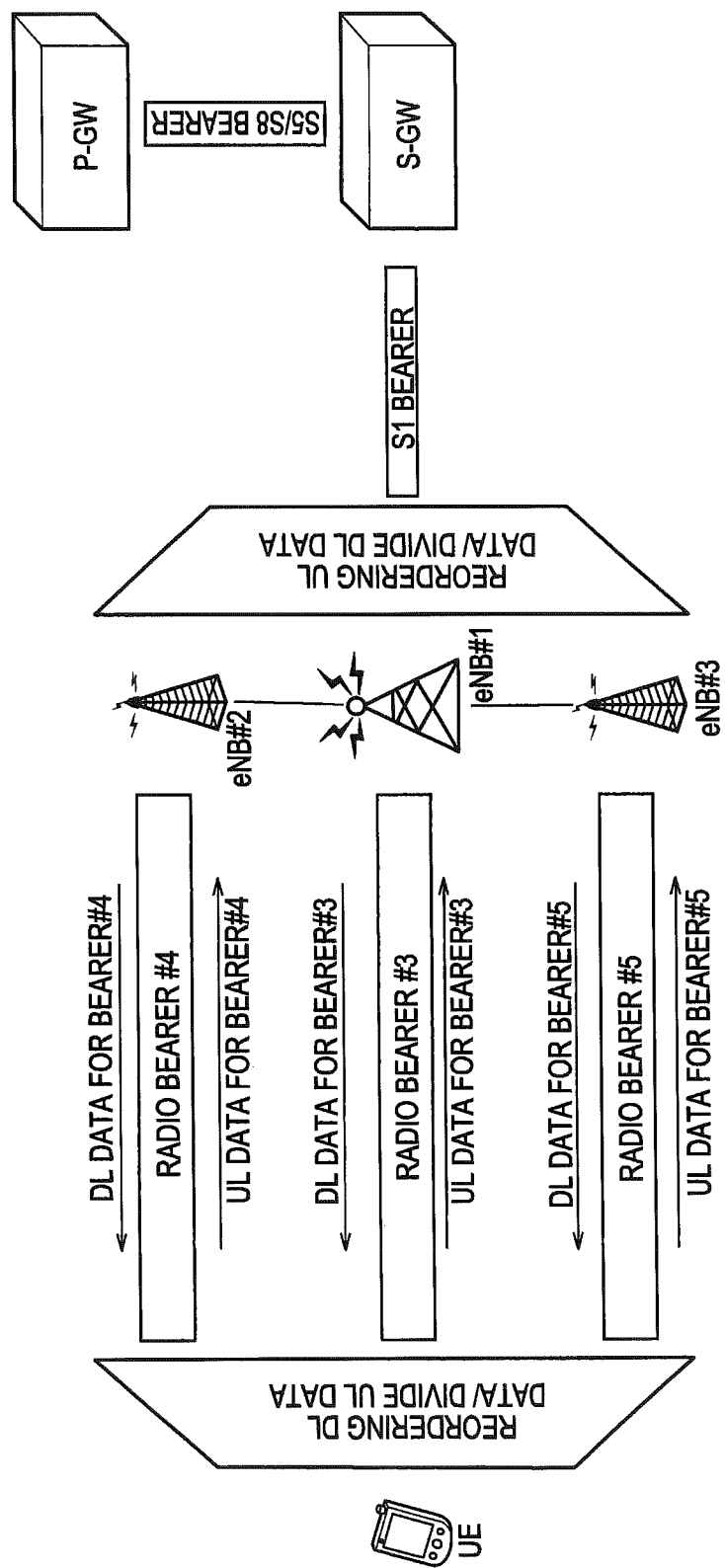
FIG. 2 is a diagram for illustrating "Bearer sharing" in the mobile communication system according to the first embodiment of the present invention.

In such a case, as illustrated in FIG. 2, in the uplink, data of the radio bearer #3 is transmitted from the mobile station UE to the radio base station eNB#1 through the cell #1 under the radio base station eNB#1.

Also, as illustrated in FIG. 2, in the uplink, data of the radio bearer #4 is transmitted from the mobile station UE to the radio base station eNB#1 through the cell #2 under the radio base station eNB#2.

Furthermore, as illustrated in FIG. 2, data of the radio bearer #5 is transmitted from the mobile station UE to the radio base station eNB#1 through the cell #3 under the radio base station eNB#3.

Similarly, as illustrated in FIG. 2, in the downlink, data of the radio bearer #3 is transmitted from the radio base station eNB#1 to the mobile station UE through the cell #1 under radio base station eNB#1.

Also, as illustrated in FIG. 2, in the downlink, data of the radio bearer #4 is transmitted from the radio base station eNB#2 to the mobile station UE through the cell #2 under the radio base station eNB#2.

Furthermore, as illustrated in FIG. 2, in the downlink, data of the radio bearer #5 is transmitted from the radio base station eNB#3 to the mobile station UE through the cell #3 under the radio base station eNB#3.

Here, the radio bearer #4 may terminate between the mobile station UE and the radio base station eNB#2 or may terminate between the mobile station UE and the radio base station eNB#1 through the radio base station eNB#2.

Similarly, the radio bearer #5 may terminate between the mobile station UE and the radio base station eNB#3 or may terminate between the mobile station UE and the radio base station eNB#1 through the radio base station eNB#3.

In addition, the radio base station eNB#1 functioning as an anchor radio base station eNB transmits the data, which is addressed to the mobile station UE and is received through the S1 bearer, to the mobile station UE in the downlink through the radio bearers #3 to #5 by diving it into pieces of data for cells #1 to #3.

Also, the radio base station eNB #1 functioning as an anchor radio base station eNB transmits the data for the cell #1 to #3, which is received through the radio bearers #3 to #5, to the S1 bearer in the uplink after reordering processing is performed on the data.

On the other hand, the mobile station UE is configured to perform the reordering processing on the data for the cells #1 to #3 received through the radio bearers #3 to #5, in the downlink.

In addition, the mobile station UE transmits the data to be transmitted in the uplink to the radio base stations eNB #1 to #3 through the radio bearers #3 to #5 by dividing the data into pieces for the cells #1 to #3.

Here, the radio base station eNB#1 functioning as an anchor radio base station eNB may notify the mobile station UE of information for performing the above-described mapping by dedicated signaling.

Then, the radio base station eNB#1 functioning as an anchor radio base station eNB may notify the mobile station UE of the information for performing the above-described mapping by using an RRC (Radio Resource Control) message, for example, "RRC connection reconfiguration" or the like as dedicated signaling.

In addition, the radio base station eNB#1 functioning as an anchor radio base station eNB may notify the content of the above-described mapping table (see, FIG. 1) as the information for performing the above-described mapping.

Figure 3:
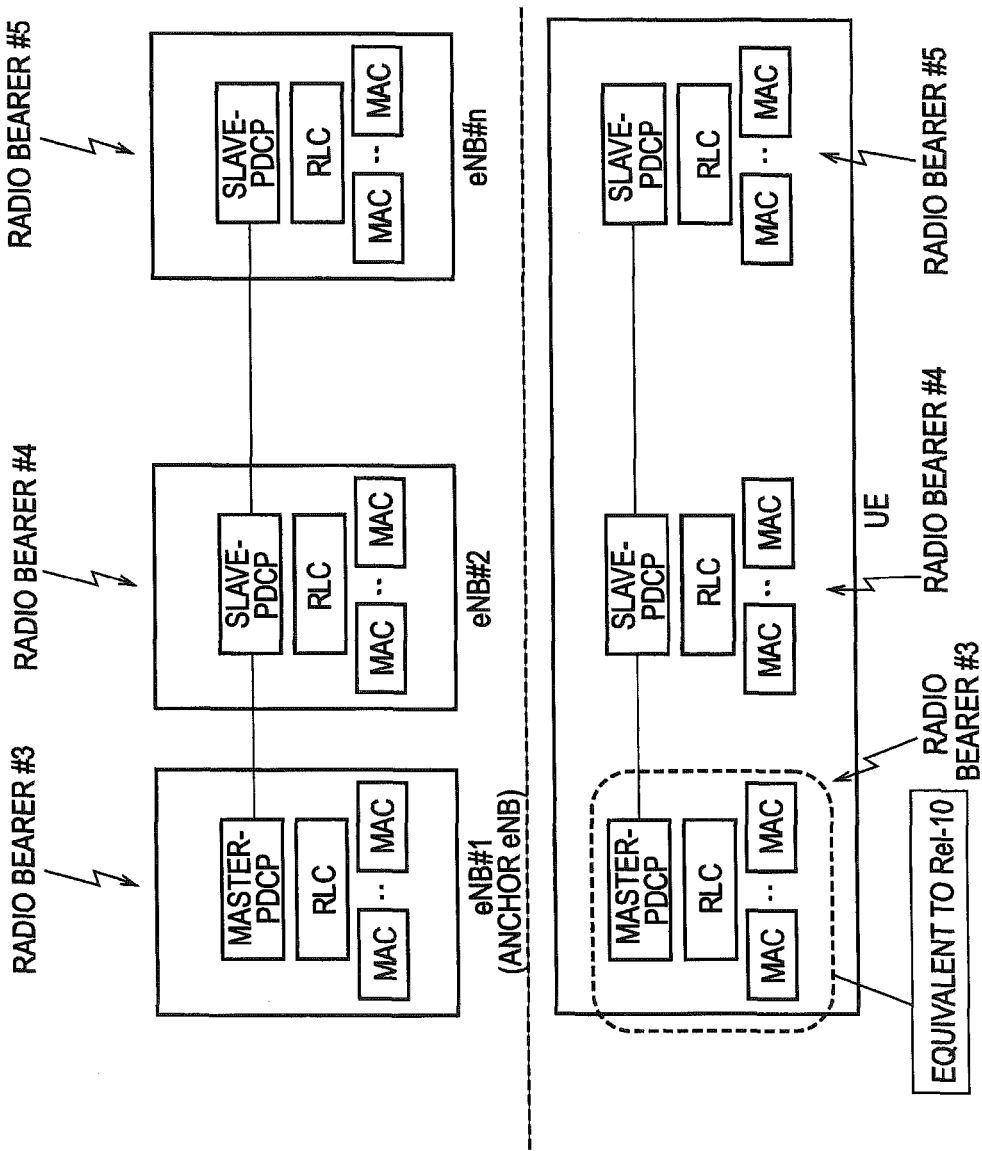
FIG. 3 is a diagram for illustrating architecture of a layer 2 in a radio base station and a mobile station according to the first embodiment of the present invention.

Specifically, as illustrated in FIG. 3, the mobile station UE and the radio base stations eNB#1 to eNB#3 include a MAC (Media Access Control) entity, an RLC (Radio Link Control) entity, and a PDCP (Packet Data Convergence Protocol) entity for each radio bearer.

Here, the radio base station eNB#1 functioning as an anchor radio base station eNB includes a "Master PDCP entity" as the PDCP entity.

In contrast, the radio base stations eNB#2 and eNB#3 other than the anchor radio base station eNB include a "Slave PDCP entity" as the PDCP entity.

In addition, the mobile station UE includes a "Master PDCP entity" and a "Slave PDCP entity" as the PDCP entities.

Here, the "Master PDCP entity" corresponds to the radio bearer #3 and the "Slave PDCP entity" corresponds to the radio bearers #4 and #5.

Then, when the PDCP entities independently operate in the radio base stations eNB#1 to #3 in the case where one EPS bearer is mapped to the multiple radio bearers #3 to #5, the reordering processing on the PDCP-PDUs (Protocol Data Units) transmitted/received through the EPS bearer in the uplink and the downlink cannot be performed.

For this reason, the "Master PDCP entity" may be configured to control one or more "Slave PDCP entities."

Specifically, the "Master PDCP entity" performs header compression, security management, or handling of "UL/DL PDCP SN (Sequence Number)" on a PDCP-PDU which is transmitted/received though the EPS bearer.

Also, one part of the function of the "Master PDCP entity" may be performed by the "Slave PDCP entity."

In addition, the "Master PDCP entity" may distribute the PDCP-PDU which is transmitted/received through the EPS bearer in the downlink to the "Slave PDCP entity" by a round robin or may distribute the PDCP-PDU which is transmitted/received through the EPS bearer in the downlink to the "Slave PDCP entity" in consideration of weighting based on a radio quality.

Instead, the distribution may be determined by a congestion state or throughput in each radio base station eNB. Here, the throughput may be expressed by the number of mobile stations UE in connection, a CPU usage rate, a buffer usage rate, the number of established bearers, a non-DRX ratio, or the like.

The "Slave PDCP entity" hands over the PDCP-PDU (downlink data) received from the "Master PDCP entity" to the RLC entity.

Here, the "Slave PDCP entity" may transmit a request for the distribution of the PDCP-PDU (downlink data) to the "Master PDCP entity" and the "Master PDCP entity" may perform the distribution in response to the request for the distribution of the PDCP-PDU (downlink data).

The "Master PDCP entity" refers to the mapping table to perform the reordering processing on the PDCP-PDUs in the uplink and downlink.

Here, the RLC entity and MAC entity illustrated in FIG. 3 are basically same with the RLC entity and MAC entity in the LTE Release 10/11.

An operation of the mobile communication system according to the present embodiment will be described below with reference to FIGS. 4 to 6.

Firstly, an operation when the "Bearer Sharing" is started in the mobile communication system according to the present embodiment will be described with reference to FIG. 4.

Figure 4:
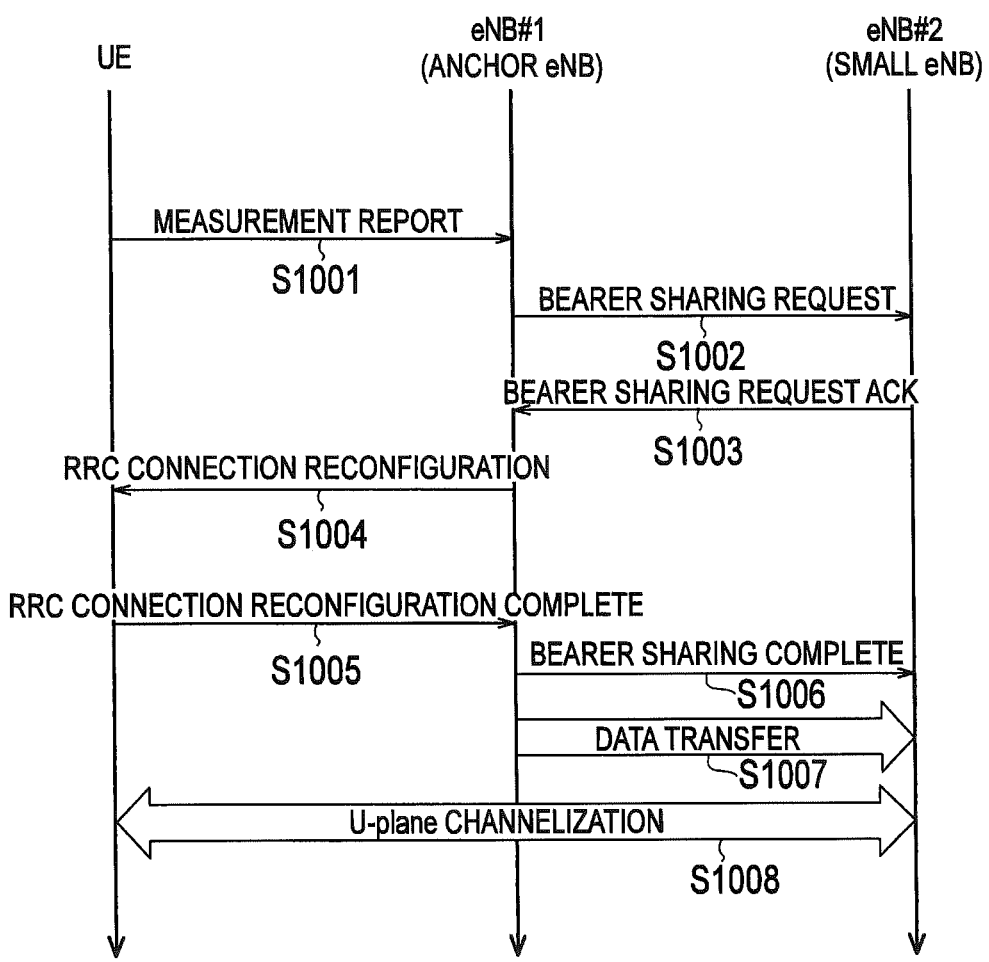
FIG. 4 is a sequence diagram for illustrating an operation of the mobile communication system according to the first embodiment of the present invention.

As illustrated in FIG. 4, at step S1001, the mobile station UE in "RRC Connected state" in the cell #1 which is a macro cell transmits a "Measurement report" indicating that a quality of the cell #2 which is a small cell has improved to the radio base station eNB#1.

At step S1002, the radio base station eNB#1 transmits a "Bearer sharing request" to the radio base station eNB#2 in response to the "Measurement report."

At step S1003, the radio base station eNB#2 transmits a "Bearer sharing request ACK" to the radio base station eNB#1 when it is determined that the "Bearer Sharing" can be started in response to the "Bearer sharing request."

At step S1004, the radio base station eNB#1 transmits to the mobile station UE, an "RRC connection reconfiguration" including information for mapping the EPS bearer #B to radio bearers #3/#4, and radio base stations eNB#1/#2 (or cells #1/#2).

At step S1005, in response to the "RRC connection reconfiguration," the mobile station UE performs the described-above mapping and transmits an "RRC connection reconfiguration complete" to the radio base station eNB#1.

At step S1006, the radio base station eNB#1 transmits a "Bearer sharing complete" to the radio base station eNB#2, and, at step S1007, starts transfer of data (U-plane data) addressed to the mobile station UE to the radio base station eNB#2.

As a result, at step S1008, a channelization of the U-plane path is formed between the mobile station UE and the radio base station eNB#2. In other words, the "Bearer Sharing" is started.

Here, even when the "Bearer Sharing" is started, the C-plane path remains between the mobile station UE and the radio base station eNB#1.

Secondly, an operation which is performed when the "Bearer Sharing" (which is mainly lead by the mobile station UE and the radio base station eNB#1) is terminated in the mobile communication system according to the present embodiment will be described with reference to FIG. 5.

Figure 5:
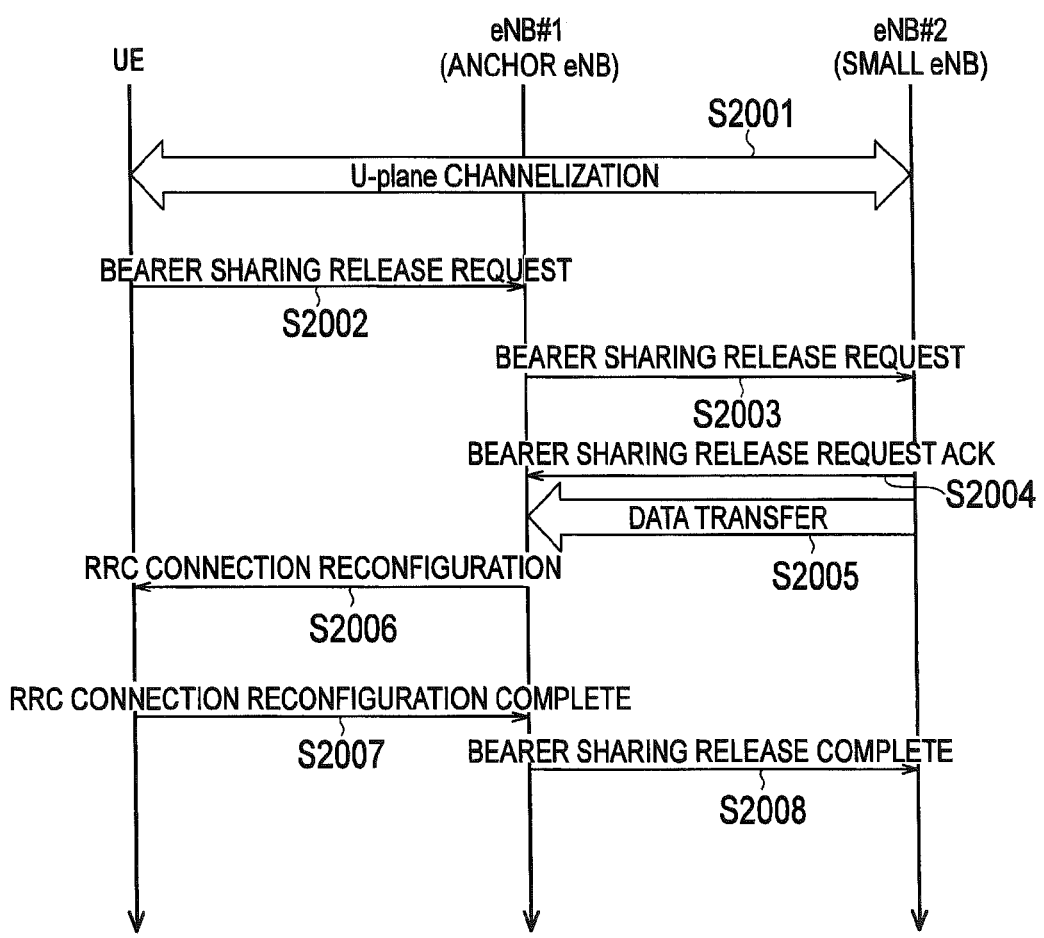
FIG. 5 is a sequence diagram for illustrating an operation of the mobile communication system according to the first embodiment of the present invention.

As illustrated in FIG. 5, at step S2001, in a state where the U-plane path is channelized between the mobile station UE and the radio base station eNB#2, in other words, in a state where the "Bearer Sharing" is performed, for example, when a quality in the cell #2 is deteriorated, at step S2002, the mobile station UE transmits a "Bearer sharing release request" to the radio base station eNB#1.

Here, the mobile station UE may notify the "Bearer sharing release request" by including it in a "Measurement report."

At step S2003, the radio base station eNB#1 transmits the "Bearer sharing release request" to the radio base station eNB#2 and terminates the transfer of the data (U-plane data) addressed to the mobile station UE to the radio base station eNB#2.

At step S2004, the radio base station eNB#2 transmits a "Bearer sharing release request ACK" to the radio base station eNB#1, and at step S2005, transfers all pieces of data (U-plane data) in the radio bearer #4 which is a target of the "Bearer Sharing."

At step S2006, the radio base station eNB#1 transmits to the mobile station UE, an "RRC connection reconfiguration" including information to cancel the mapping of the EPS bearer #B to the radio bearers #3/#4, and the radio base stations eNB#1/#2 (or cells #1/#2).

At step S2007, in response to the "RRC connection reconfiguration," the mobile station UE cancels the above-described mapping and transmits an "RRC connection reconfiguration complete" to the radio base station eNB#1.

At step S2008, the radio base station eNB#1 transmits the "Bearer sharing release complete" to the radio base station eNB#2.

Thirdly, an operation which is performed when the "Bearer Sharing" is terminated (which is mainly lead by the radio base station eNB#2) in the mobile communication system according to the present embodiment will be described with reference to FIG. 6.

Figure 6:
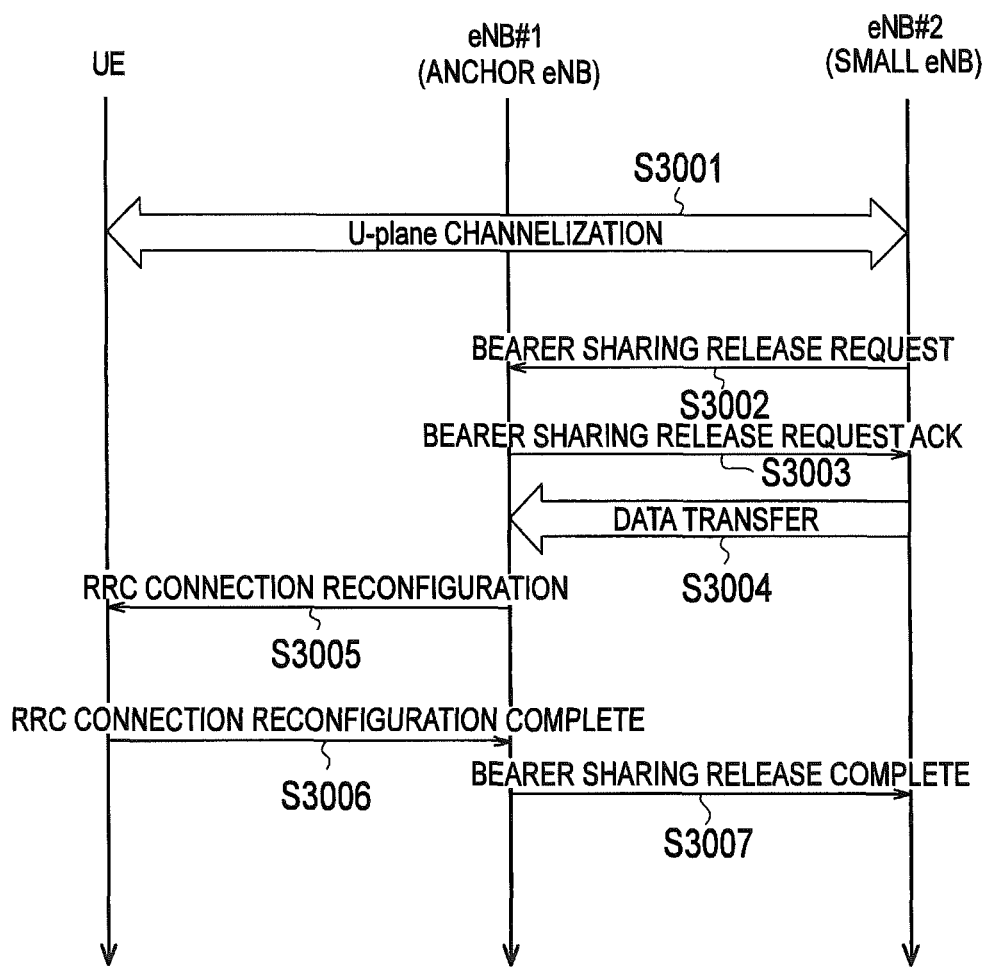
FIG. 6 is a sequence diagram for illustrating an operation of the mobile communication system according to the first embodiment of the present invention.

As illustrated in FIG. 6, at step S3001, in a state where the U-plane path is channelized between the mobile station UE and the radio base station eNB#2, in other words, in a case where the "Bearer Sharing" is performed, when the radio base station eNB#2 detects at step S3002 that the mobile station UE has moved to an outside of the cell #2, for example, the radio base station eNB#2 transmits a "Bearer sharing release request" to the radio base station eNB#1.

At step S3003, the radio base station eNB#1 transmits a "Bearer sharing release request ACK" to the radio base station eNB#2.

Here, the radio base station eNB#1 terminates the transfer of the data (U-plane data) addressed to the mobile station UE to the radio base station eNB#2.

At step S3004, the radio base station eNB#2 transfers all pieces of the data (U-plane data) in the radio bearer #4 which is a target of the "Bearer Sharing" to the radio base station eNB#1.

The following operations at steps S3005 to S3007 are same as those of steps S2006 to S2008 in FIG. 5.

Modification 1

A mobile communication system according to Modification of the present invention will be described below with reference to FIG. 7, by paying attention to a difference from the mobile communication system according to the first embodiment.

In a mobile communication system according to Modification 1, as similar to the mobile communication system according to the first embodiment, an identifier (#B) of one EPS bearer is mapped to identifiers (#3 to #5) of multiple radio bearers, and identifiers (#1 to #3) of multiple radio base stations eNB.

Here, in the mobile communication system according to Modification 1, the mapping may differ between the uplink and the downlink.

Figure 7:
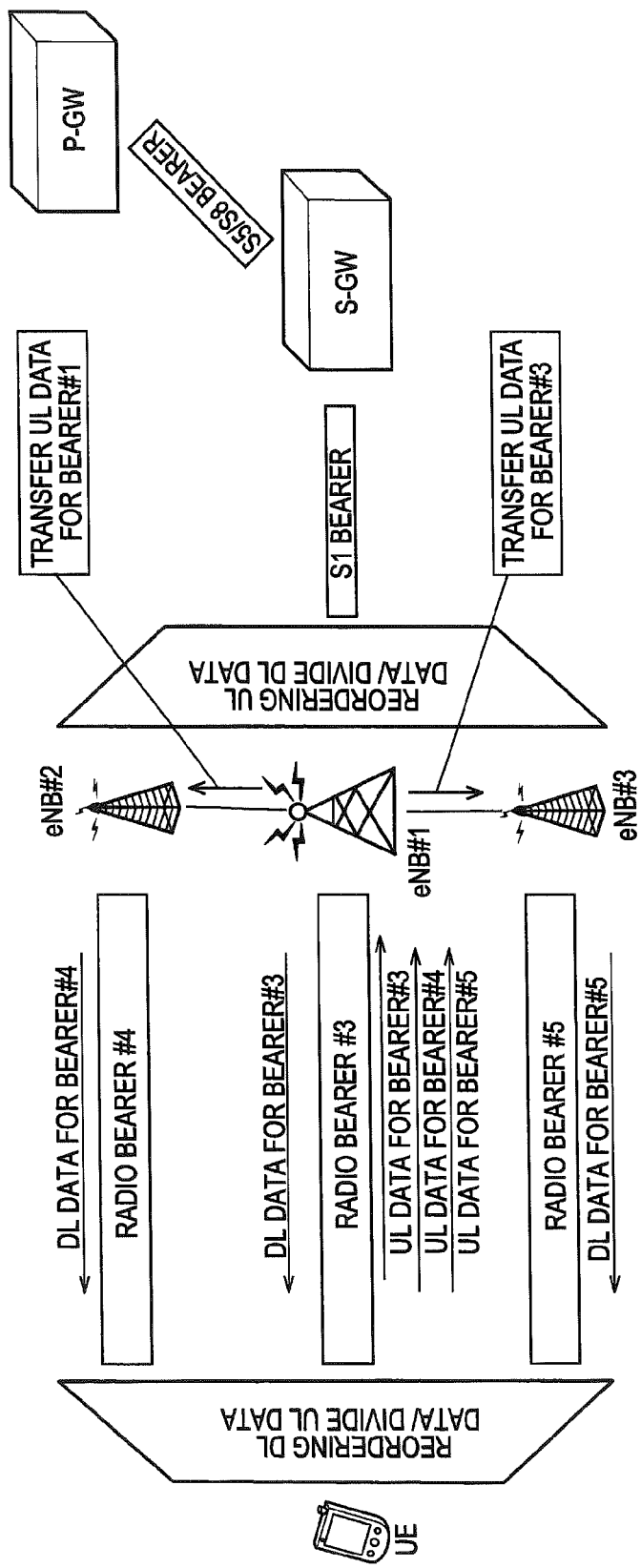
FIG. 7 is a diagram for illustrating "Bearer sharing" in a mobile communication system according to Modification 1 of the present invention.
Figure 8:
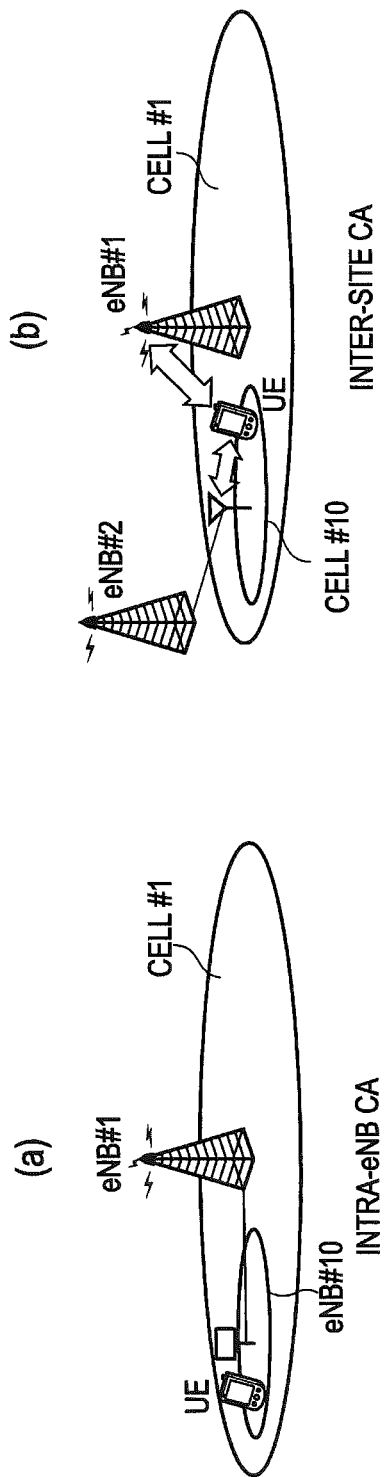
FIG. 8 is a diagram for illustrating a conventional technology.
Figure 9:
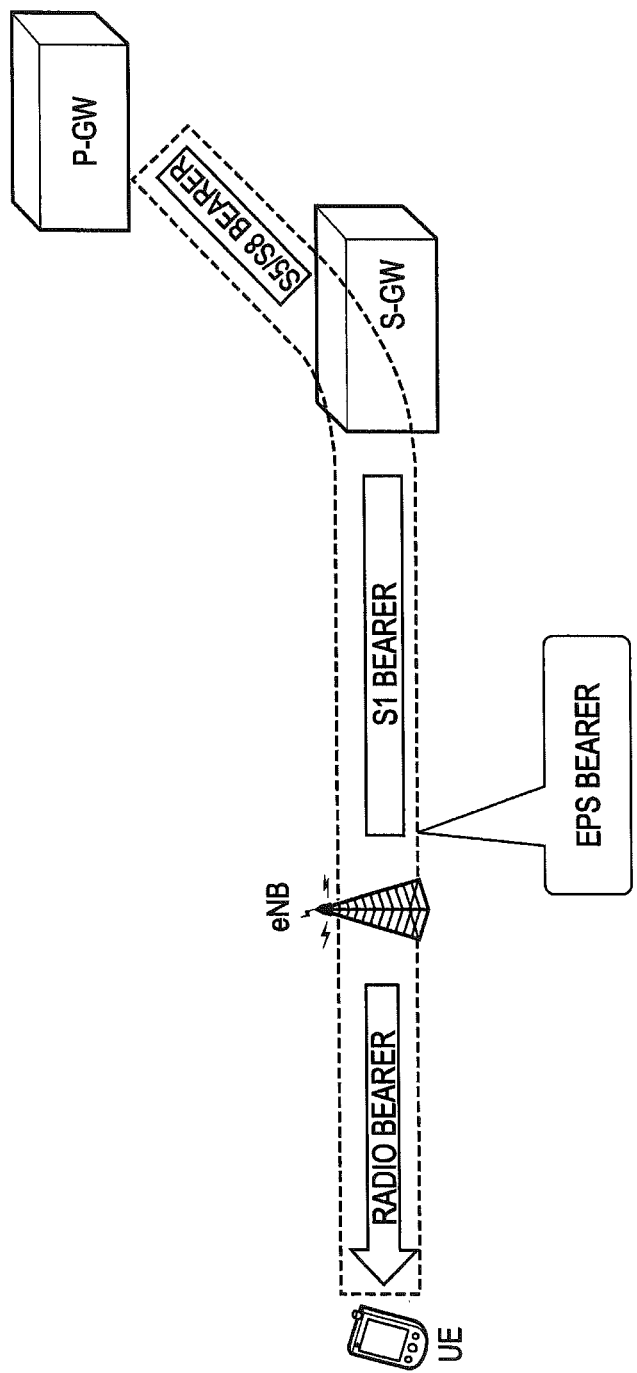
FIG. 9 is a diagram for illustrating the conventional technology.

For example, as illustrated in FIG. 7, in the downlink, data of the radio bearer #3 is transmitted from the radio base station eNB#1 to the mobile station UE through the cell #1 under the radio base station eNB#1.

Also, as illustrated in FIG. 7, in the downlink, data of the bearer #4 is transmitted from the radio base station eNB#2 to the mobile station UE through the cell #2 under the radio base station eNB#2.

Furthermore, as illustrated in FIG. 7, in the downlink, data of the radio bearer #5 is transmitted from the radio base station eNB#3 to the mobile station UE through the cell #3 under the radio base station eNB#3.

On the other hand, in the uplink, as illustrated in FIG. 7, all pieces of data of the radio bearers #3 to #5 are transmitted from the mobile station UE to the radio base station eNB#1 through the cell #1 under the radio base station eNB#1.

For example, when the cells #2/#3 are "DL only cell," data cannot be transmitted in the uplink with the "DL only cell." Therefore, as illustrated in FIG. 7, all pieces of the data of the radio bearers #3 to #5 have to be transmitted in the cell #1 in which "UL Cell" is set.

In such a case, the radio base station eNB#1 transfers the data received in the uplink to the RLC entity or PDCP entity of the radio base stations eNB#2/#3 through an interface between the radio base stations.

Instead, the RLC entity or MAC entity may be accommodated separately in the radio base stations eNB in the downlink and uplink.

The features of the present embodiment may also be expressed as follows.

A first feature of the present embodiment is summarized as a mobile communication system in which a mobile station UE is capable of performing "Inter-Site CA (carrier aggregation through cells under multiple radio base stations)". Here, an anchor radio base station eNB (for example, radio base station eNB1) which is one of the multiple radio base stations eNB#1 to eNB#3 maps one bearer EPS established between the mobile station UE and a gateway device P-GW to multiple radio bearers #3 to #5 established between the mobile station UE and the multiple radio base stations eNB#1 to eNB#3.

With the above-described configuration, the anchor radio base station eNB maps one EPS bearer to multiple radio bearers, so that a bearer configuration which is suitable for carrying out "Inter-site CA" can be achieved.

In the first feature of the present embodiment, the anchor radio base station eNB may perform the mapping by using a mapping table in which an identifier (#B) of the one EPS bearer, identifiers (#3 to #5) of the multiple radio bearers and identifiers (#1 to #3) of the multiple radio base stations eNB or the cells are associated with one another.

With the above-described configuration, the anchor radio base station eNB can achieve a bearer configuration which is suitable for easily carrying out "Inter-site CA" by using a mapping table.

In the first feature of the present embodiment, the mapping may differ between an uplink and a downlink.

With the above-described configuration, the "Inter-site CA" can be achieved even when the cells #2/#3, which are small cells, are "DL only Cell."

In the first feature of the present embodiment, by dedicated signaling, the mobile station UE may be notified of information for performing the mapping.

With the above-described configuration, information to achieve a bearer configuration, which is suitable for carrying out the "Inter-site CA," can be notified to the mobile station UE by using an existing signaling.

In the first feature of the present embodiment, the multiple radio base stations eNB#1 to eNB#3 and the mobile station UE may have PDCP entities corresponding to the multiple radio bearers, respectively, the PDCP entities may include a "Master PDCP entity (master PDCP entity)" provided in each of the anchor radio base station eNB (for example, radio base station eNB#1) and the mobile station UE, and a "Slave PDCP entity (slave PDCP entity)" provided in each of the radio base station eNB#2/#3 other than the anchor radio base station eNB (for example, radio base station eNB#1) and the mobile station UE, and the "Master PDCP entity" may control the "Slave PDCP entity."

With the above-described configuration, even when the PDCP entities independently operate in the radio base stations eNB#1 to eNB#3 in a case where one EPS bearer is mapped to the multiple radio bearers #3 to #5, the reordering processing on the PDCP-PDUs transmitted/received through the EPS bearer in the uplink and the downlink can be performed.

A second feature of the present embodiment is summarized as a radio base station eNB in the mobile communication system capable of operating as an anchor radio base station eNB in which the mobile station UE can carry out the "Inter-site CA". Here, the radio base station eNB maps one EPS bearer #B to the multiple radio bearers #3 to #5.

A third feature of the present embodiment is summarized as a mobile station UE configured to be capable of performing "Inter-site CA." Here, the mobile station UE maps one EPS bearer #B to the multiple radio bearers #3 to #5.

Here, the foregoing operations of the mobile station UE, the radio base stations eNB#1/eNB#2/eNB#3, and the gateway devices P-GW/S-GW may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE, the radio base stations eNB#1/eNB#2/eNB#3, and the gateway devices P-GW/S-GW. Otherwise, the storage medium and the processor may be provided as discrete components inside the mobile station UE, the radio base stations eNB#1/eNB#2/eNB#3, and the gateway devices P-GW/S-GW.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-187811 (filed on Aug. 28, 2012) is incorporated by reference in the present specification.

INDUSTRIAL APPLICABILITY

As described above, the present invention can provide a mobile communication system, a radio base station, and a mobile station, in which a bearer configuration can be properly defined when "Inter-site CA" is used.

EXPLANATION OF REFERENCE NUMERALS eNB#1, eNB#2, eNB#3 radio base station
UE mobile station
P-GW, S-GW gateway device

The invention claimed is:

1. A mobile communication system, comprising:
a mobile station that performs carrier aggregation through cells under a plurality of radio base stations,
an anchor radio base station which is one of the plurality of radio base stations maps one Evolved Packet System (EPS) bearer established between the mobile station and a gateway device to a plurality of radio bearers established between the mobile station and the plurality of radio base stations, wherein
the anchor radio base station performs the mapping by using an association among an identifier of the one EPS bearer, identifiers of the plurality of radio bearers, and identifiers of the plurality of radio base stations or the cells,
data of a radio bearer, which is established between the mobile station and a radio base station other than the anchor radio base station among the plurality of radio base stations, is transmitted between the mobile station and the anchor radio base station through the radio base station other than the anchor radio base station, and
the radio base station other than the anchor radio base station transmits to or receives from a PDCP entity of the anchor radio base station the data of the radio bearer which is established between the mobile station and the radio base station other than the anchor radio base station.

2. The mobile communication system according to claim 1, wherein the mapping differs between an uplink and a downlink.

3. The mobile communication system according to claim 1, wherein by dedicated signaling, the mobile station is notified of information for performing the mapping.

4. The mobile communication system according to claim 1, wherein
the plurality of radio base stations and the mobile station have PDCP entities corresponding to the plurality of radio bearers, respectively,
the PDCP entities include a master PDCP entity provided in each of the anchor radio base station and the mobile station, and a slave PDCP entity provided in each of the radio base station other than the anchor radio base station and the mobile station, and
the mater PDCP entity controls the slave PDCP entity.

5. A radio base station operates as an anchor radio base station among a plurality of radio base stations in a mobile communication system, wherein
the mobile station performs carrier aggregation through cells under the plurality of radio base stations,
one Evolved Packet System (EPS) bearer established between a mobile station and a gateway device is mapped to a plurality of radio bearers established between the mobile station and the plurality of radio base stations,
the mapping is performed by using an association among an identifier of the one EPS bearer, identifiers of the plurality of radio bearers, and identifiers of the plurality of radio base stations or the cells,
data of a radio bearer, which is established between the mobile station and a radio base station other than the anchor radio base station among the plurality of radio base stations, is transmitted between the mobile station and the anchor radio base station through the radio base station other than the anchor radio base station, and
the radio base station other than the anchor radio base station transmits to or receives from a PDCP entity of the anchor radio base station the data of the radio bearer which is established between the mobile station and the radio base station other than the anchor radio base station.

6. A mobile station, wherein
the mobile station performs carrier aggregation through cells under the plurality of radio base stations,
one Evolved Packet System (EPS) bearer established with a gateway device is mapped to a plurality of radio bearers established with a plurality of radio base stations,
the one EPS bearer is mapped to the plurality of radio bearers based on mapping performed in an anchor radio base station among the plurality of radio base stations by using an association among an identifier of the one EPS bearer, identifiers of the plurality of radio bearers, and identifiers of the plurality of radio base stations or the cells, and
data of a radio bearer, which is established between the mobile station and a radio base station other than the anchor radio base station among the plurality of radio base stations, is transmitted between the mobile station and the anchor radio base station through the radio base station other than the anchor radio base station, and
the radio base station other than the anchor radio base station transmits to or receives from a PDCP entity of the anchor radio base station the data of the radio bearer which is established between the mobile station and the radio base station other than the anchor radio base station.

* * * * *